US012440753B2

(12) United States Patent
Liu

(10) Patent No.: US 12,440,753 B2
(45) Date of Patent: Oct. 14, 2025

(54) DOUBLE-ENDED SLIDE RAIL

(71) Applicant: Guangdong Gogole Technology Co., Ltd., Huizhou (CN)

(72) Inventor: Xianfeng Liu, Yongzhou (CN)

(73) Assignee: Guangdong Gogole Technology Co., Ltd.

( * ) Notice: Subject to any disclaimer, the term of this patent is extended or adjusted under 35 U.S.C. 154(b) by 165 days.

(21) Appl. No.: 17/724,536

(22) Filed: Apr. 20, 2022

(65) Prior Publication Data

US 2023/0338828 A1 Oct. 26, 2023

(51) Int. Cl.
*A63F 13/24* (2014.01)

(52) U.S. Cl.
CPC ...... *A63F 13/24* (2014.09); *A63F 2300/1043* (2013.01)

(58) Field of Classification Search
CPC ... A63F 13/24; A63F 2300/1043; A63F 13/98
See application file for complete search history.

(56) References Cited

U.S. PATENT DOCUMENTS

2016/0361640 A1* 12/2016 Iwao ..................... A63F 13/235

* cited by examiner

*Primary Examiner* — Peter J Iannuzzi
(74) *Attorney, Agent, or Firm* — Jose Cherson Weissbrot

(57) ABSTRACT

The present application discloses a double-ended slide rail and a gamepad, which comprises a base, wherein two sides of the base are respectively provided with slide rails, the two slide rails are symmetrically arranged along the axial direction of the base and have the same structure, and wherein the slide rail on either side is used for connecting with the gamepad, and the slide rail on the other side is used for sleeve-connecting with an equipment host or the slide rail; a mounting groove, which is arranged at one end of the slide rail, wherein the surface of the mounting groove is provided with a guide mark, the back of the mounting groove is provided with a guide pin, and the guide pins of the two slide rails are in contact connection; a limit key, which is arranged at one end of the base. According to the double-ended slide rail and the gamepad, the slide rails on both sides of the base have the same structure and can be connected with the left and right ends of the gamepad, so that two sets of molds need not be produced corresponding to the left and right sides, and the manufacturing cost is saved. Furthermore, the double-ended slide rail does not contain a circuit part, so the circuit does not need to be replaced in the maintenance process, thus reducing the maintenance cost. Because the base adopts a double-sided slide rail structure, it has higher structural strength and is not easy to loosen after long-term use compared with a single slide rail structure.

9 Claims, 7 Drawing Sheets

DOUBLE-ENDED SLIDE RAIL

TECHNICAL FIELD

The present application relates to the technical field of gamepads, and in particular to a double-ended slide rail and a gamepad.

BACKGROUND

Mobile phones, tablet computers, and handheld gamepads have become the electronic devices that people carry with them every day, and especially the appearance of more and more large-screen touch-screen devices has promoted the development of the game industry. With people's increasing demand for games, the screen of game equipment is getting bigger and bigger. To facilitate the operation of a user, a kind of gamepads that can be plugged into the two sides of the equipment appears on the market. The two sides of the equipment are provided with chutes, and the gamepad is inserted into the chutes through slide rails to realize different play modes of the equipment.

In the existing pluggable gamepad, separate mold making is required since the slide rails correspond to the left and right gamepads, so the manufacturing cost is high. In addition, the slide rail is also provided with a PCB circuit board, which is used to communicate and transmit signals with the equipment host. When the slide rail is damaged, it needs to be replaced together with the PCB circuit board, so the maintenance cost is high. The unilateral slide rail has a thin structure, which is easy to loosen after long-term use. When the gamepad is held on one side, the weight of the equipment host acts on the unilateral slide rail, which affects the service life.

SUMMARY

The present application aims at least to solve the problem in the prior art that separate mold making is required since the slide rails correspond to the left and right gamepads, and the manufacturing cost is high. When the slide rail is damaged, it needs to be replaced together with the PCB, so the maintenance cost is high. The unilateral slide rail has a thin structure and is easy to loosen after being used for a long time, thus affecting the service life. Therefore, the present application provides a double-ended slide rail and a gamepad, which is universal for the assembly of left and right gamepads, and has the advantages of a low manufacturing cost, no circuit part, a low maintenance cost, a thick structure and is less liable to loosen.

According to some embodiments of the present application, the double-ended slide rail includes a base, wherein two sides of the base are respectively provided with slide rails, the two slide rails are symmetrically arranged along an axial direction of the base, the two slide rails have the same structure, the slide rail on either side is used for connecting with a gamepad, and the slide rails on the other side is used for sleeve-connecting with an equipment host or the slide rail; a mounting groove arranged at one end of the slide rail, wherein a surface of the mounting groove is provided with a guide mark, a back of the mounting groove is provided with a guide pin, and the guide pins of two slide rails are in contact connection; a limit key arranged at one end of the base.

According to some embodiments of the present application, the base is provided with a plurality of mounting holes, and the mounting holes pass through the end faces of the two slide rails; a shoulder key is installed in the mounting hole, a fixed post is inserted into the mounting hole from one side of the base, and the shoulder key is sleeved on the fixed post.

According to some embodiments of the present application, the shoulder key comprises a key body and a socket post, the key body is hollowed out, the socket post is arranged at the middle part of the key body; elastic supports extend respectively along the sidewall of the key body at the two sides of the socket post, and the socket post is sleeved with the fixed post; when the shoulder key slides in the mounting hole, the socket post, and the fixed post are relatively stationary, and the two elastic supports are deformed towards a sliding direction of the shoulder key.

According to some embodiments of the present application, the base is provided with a mating groove, and the mating groove passes through the end faces of the two slide rails; a mating button is installed in the mating groove, and the fixed post is inserted into the mating groove from one side of the base; the mating button is sleeved on the fixed post, and the mating button has a same structure as the shoulder key.

According to some embodiments of the present application, the base is provided with a plurality of light guide grooves at equal intervals, the light guide grooves pass through the end faces of the two slide rails, and light pipes are arranged in the light guide grooves, and the number of the light pipes is equal to that of the light guide grooves.

According to some embodiments of the present application, one end of the base is provided with a limit groove, the limit groove passes through both sides of the base, the limit key is arranged in the limit groove, and a grooving direction of the limit groove is parallel to an end face of the slide rail.

According to some embodiments of the present application, the limit key includes a connecting post a linkage disk, and two interlocking pieces, wherein the connecting post is inserted into the limit groove from one end of the base, and the linkage disk is sleeved with the connecting post; the two interlocking pieces are matched with each other, an elastic piece is arranged between the two interlocking pieces, and one end of the elastic piece contacts an end face of the interlocking piece and the other end contacts an end face of the other interlocking piece; the linkage disk is engaged with the tops of the two interlocking pieces, and is used for linking the two interlocking pieces such that the two interlocking pieces synchronously approach each other or are separated from each other.

According to some embodiments of the present application, a limit post protrudes from the top of the interlocking piece, and both ends of the linkage disk are provided with U-shaped grooves; after the two interlocking pieces are matched, the two U-shaped grooves of the linkage disk are respectively engaged with the limit posts of the two interlocking pieces; one side of the interlocking piece is provided with a sliding groove and the other side is provided with a guide post, and the sliding groove of the interlocking piece is matched with the guide post of the other interlocking piece.

According to some embodiments of the present application, the guide pin is L-shaped, a long end of the guide pin fits the back of the mounting groove, a short end of the guide pin extends into the base, and the short ends of the guide pins on both sides are in contact connection in the base.

A gamepad according to some embodiments of the present application includes the above double-ended slide rai, wherein the gamepad further includes a shell and a circuit board provided with a plurality of trigger keys, wherein the shell is provided with a groove that is detachably connected with the slide rail of the double-ended slide rail, and the circuit board is arranged at an inner side of the groove, and one end of the circuit board is connected with the guide pin.

According to some embodiments of the present application, the double-ended slide rail and the gamepad have at least the following beneficial effects: the slide rails on both sides of the base have the same structure and can be connected with the left and right ends of the gamepad so that two sets of molds need not be produced corresponding to the left and right sides, and the manufacturing cost is saved. Furthermore, the double-ended slide rail does not contain a circuit part, so the circuit does not need to be replaced in the maintenance process, thus reducing the maintenance cost. Because the base adopts a double-sided slide rail structure, it has higher structural strength and is not easy to loosen after long-term use compared with a single slide rail structure.

Additional aspects and advantages of the present application will be outlined in part in the following description, and in part will be obvious from the following description, or may be learned by practice of the present application.

BRIEF DESCRIPTION OF DRAWINGS

The above and/or additional aspects and advantages of the present application will become apparent and easy to understand from the description of embodiments taken in conjunction with the following drawings, in which.

REFERENCE NUMBERS

Figure 1:
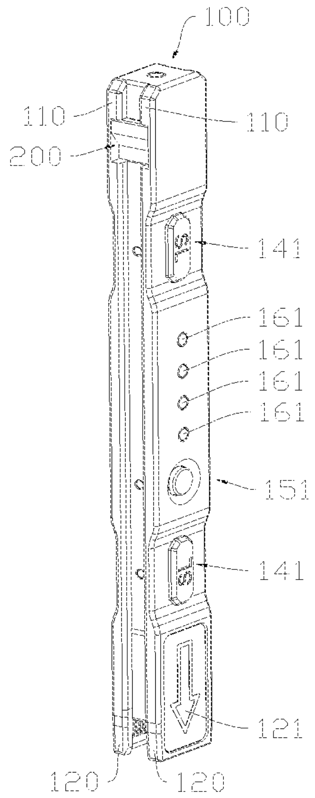
FIG. 1 is a perspective view of a double-ended slide rail according to an embodiment of the present application.

Base 100, Slide rail 110, Mounting groove 120, Guide mark 121, Guide pin 122, Limit groove 130, Mounting hole 140, Shoulder key 141, Key body 141-1, Socket post 141-2, Elastic support 141-3, Fixed post 142, Mating groove 150, Mating button 151, Light guide groove 160, Light pipe 161, Limit key 200, Connecting post 210, Linkage disk 220, U-shaped groove 221, Interlocking piece 230, Limit post 231, Sliding groove 232, Guide post 233, Elastic member 240, Shell 300, Circuit board 310.

DESCRIPTION OF EMBODIMENTS

Embodiments of the present application will be described in detail below, examples of which are shown in the accompanying drawings, in which the same or similar reference numerals refer to the same or similar elements or elements with the same or similar functions throughout. The embodiments described below concerning the accompanying drawings are exemplary, only for explaining the present application, and should not be construed as limiting the present application.

In the description of the present application, it should be understood that the directions or positional relationships related to the directions, such as up, down, front, back, left, right, top, bottom, etc., are based on the directions or positional relationships shown in the drawings, only to facilitate the description of the present application and simplify the description, but not to indicate or imply that the referred devices or elements must have a specific direction, be constructed and operated in a specific direction, and therefore should not be understood as limiting the present application.

In the description of the present application, several meanings are one or more, and many meanings are more than two. Greater than, less than, more than, etc. are understood as excluding this number, and above, below, within, etc. are understood as including this number. The description of "first" and "second" is only used to distinguish technical features, they cannot be understood as indicating or implying relative importance, implicitly indicating the number of indicated technical features or implicitly indicating the sequence of indicated technical features.

In the description of the present application, unless otherwise specified, words such as setting, installation, connection, etc. should be understood in a broad sense, and those skilled in the technical field can reasonably determine the specific meanings of the above words in the present application in combination with the specific contents of the technical solution.

Referring to FIGS. 1-7, a double-ended slide rail and a gamepad according to embodiments of the present application are described below.

As shown in FIG. 1-FIG. 7, the double-ended slide rail includes a base 100, wherein two slide rails 110 are respectively arranged on both sides of the base 100, and two slide rails 110 are symmetrically arranged along the axial direction of the base 100, that is, both sides of the base 100 extend out of the slide rails 110, and the two slide rails 110 have the same structure, which ensures that the base 100 can be connected with the left gamepad or the right gamepad. The slide rail 110 on either side of that base 100 is used for connection with the gamepad, and the slide rail 110 on the other side is used for sleeving connection with the equipment host or the slide rail 110. When the equipment host is in handheld mode, the two sides of the base 100 are respectively connected with the gamepad and the side edge of the equipment host. When the equipment host and the gamepad are used separately, the gamepad and the base 100 are separated from the equipment host. At this time, in order to ensure the grip feeling of the gamepad, one side of the base 100 originally connected to the equipment host is sleeve-connected by a slide rail 110, and the slide rails 110 are provided with the same groove position as the equipment host, which can replace the equipment host to be connected with the slide rail 110 of the base 100, thus ensuring the grip feeling of the gamepad.

Compared with the existing gamepad with a unilateral slide rail, the slide rail 110 on the corresponding side should be installed according to the left and right sides of the gamepad. The production of the slide rail 110 requires two sets of molds, which is costly. Besides, the two kinds of unilateral slide rails cannot be used in common, which easily leads to inventory accumulation, and the parts cannot be used in common.

The slide rail 110 is provided with a mounting groove 120 located at one end of the slide rail 110. The surface of the mounting groove 120 is provided with a guide mark 121 to guide the user to insert the slide rail 110 into the correct groove position, which plays the role of promoting and guiding. The rear of the mounting groove 120 is provided with a guide pin 122. Specifically, guide pins 122 of the two slide rails 110 are located at the back of the mounting groove 120, and guide pins 122 of the two slide rails 110 are in contact with each other. When the slide rails 110 are inserted into the groove of the equipment host, the gamepad realizes power transmission and communication with the equipment host through the two guide pins 122, and the equipment host supplies power or charges the gamepad, while the input instructions of the gamepad are transmitted to the equipment host through the guide pins 122.

One end of the base 100 is also provided with a limit key 200, which is arranged at a side far away from the mounting groove 120. After the double-ended slide rail is connected with the equipment host, when the user needs to disassemble the gamepad and change the user mode, the limit key 200 needs to be pressed to release the lock between the limit key 200 and the equipment host, so that the gamepad can be pulled out conveniently. The limit key 200 is in tension without an external force, which fixes the connection relationship between the double-ended slide rail and the equipment host.

According to the double-ended slide rail of the present application, other electrical components are not built in the base 100, and only the double-ended slide rail needs to be replaced in the process of gamepad maintenance so that the electrical components do not need to be replaced and the maintenance cost and difficulty are reduced. The existing unilateral slide rail integrates electrical components, cannot be disassembled and replaced and needs to be replaced as a whole. The maintenance cost is too high, and the maintenance is difficult. However, the gamepad of the present application only needs to replace the double-ended slide rail, which is low in cost and convenient. The unilateral slide rail has a thin unilateral structure, and the joint between the slide rail 110 and the equipment host is easy to loosen after long-term use. However, the double-ended slide rail of the present application has higher structural strength and can prolong the service life.

Figure 2:
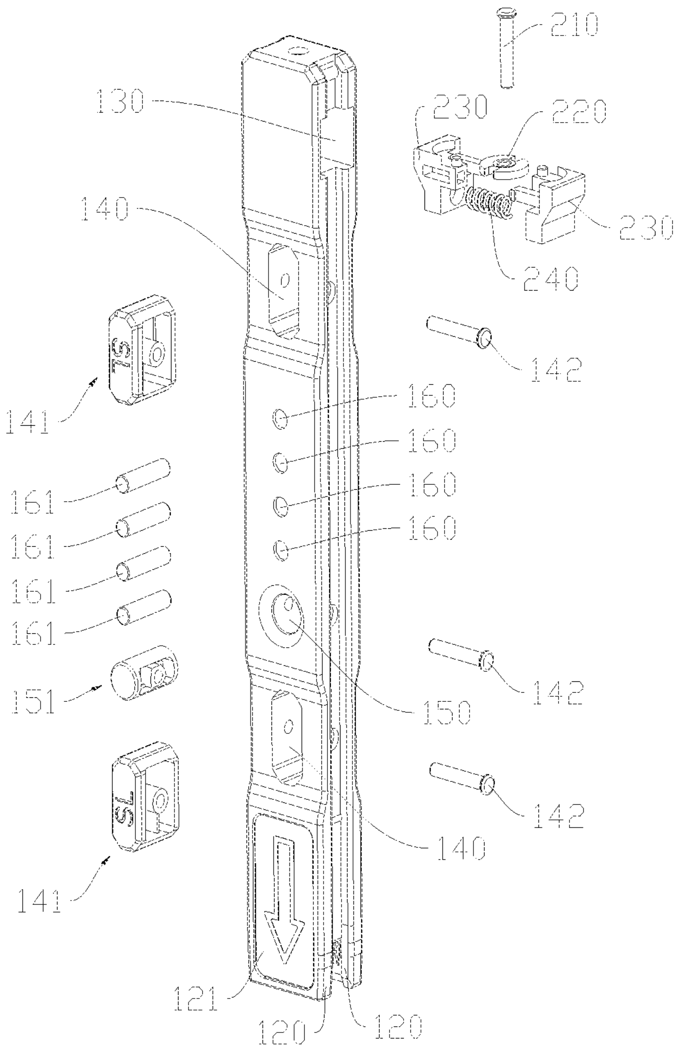
FIG. 2 is an exploded schematic diagram of a double-ended slide rail according to an embodiment of the present application.
Figure 3:
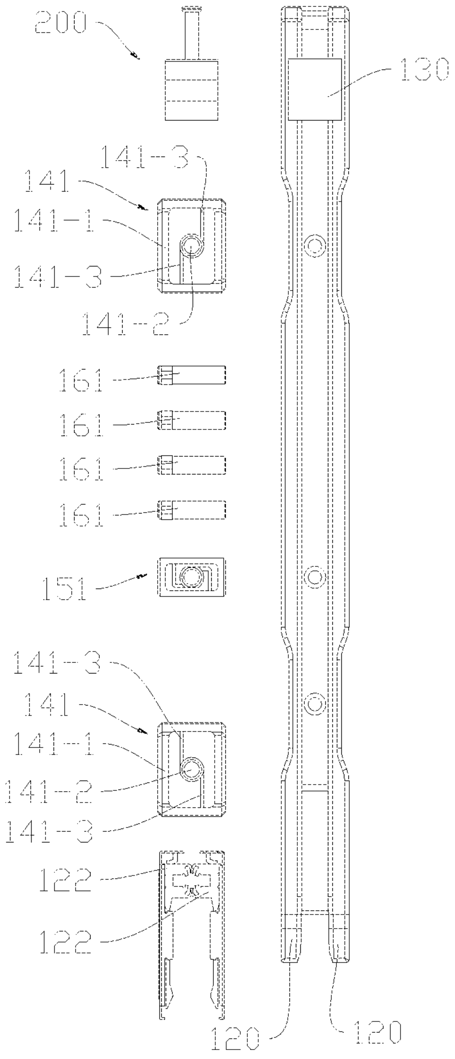
FIG. 3 is an exploded side view of the double-ended slide rail according to the embodiment of the present application.
Figure 4:
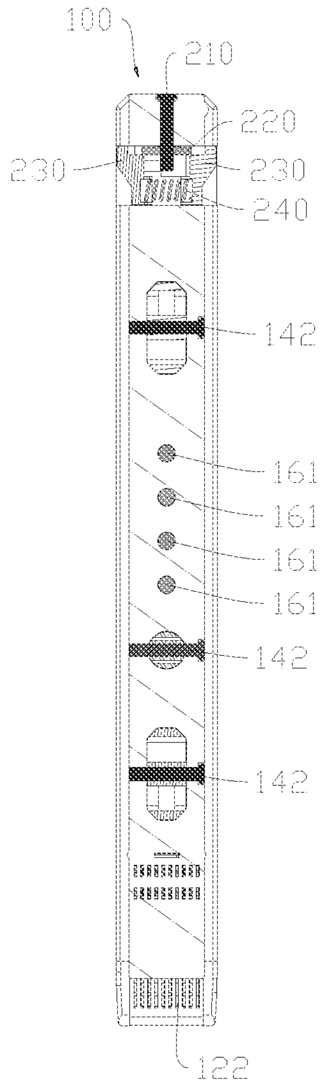
FIG. 4 is a cross-sectional view of a double-ended slide rail according to an embodiment of the present application.

In some embodiments of the present application, as shown in FIGS. 2-4, the base 100 is provided with a plurality of mounting holes 140, and the mounting holes 140 pass through the end faces of the two sliding rails 110, that is, the opening direction of the mounting holes 140 is perpendicular to the end faces of the sliding rails 110. A shoulder key 141 is installed in the mounting hole 140, a fixed post 142 is inserted into the mounting hole 140 from one side of the base 100, the shoulder key 141 is sleeved on the fixed post 142, the shoulder key 141 protrudes from the end face of the slide rail 110, and the user can press the shoulder key 141, which is higher than the end face of the slide rail 110 at the end faces of both slide rails 110. Regardless of whether the double-ended slide rail is installed on the left or right gamepad, users can press shoulder keys 141. In this embodiment, the number of the mounting holes 140 is two, and the number of the shoulder keys 141 corresponds to the number of mounting holes 140. The groove shape of the mounting holes 140 and the shape of the shoulder keys 141 matches each other.

In some embodiments of the present application, as shown in FIGS. 2 and 3, specifically, the shoulder key 141 includes a key body 141-1 and a socket post 141-2, the outer frame shape of the key body 141-1 is the same as the grooving shape of the mounting hole 140, and the inside of the key body 141-1 is hollowed out. The socket post 141-2 is arranged in the middle of the key body 141-1, and two elastic supports 141-3 extend from both sides of the socket post 141-2 along the side wall of the key body 141-1. One end of the elastic support 141-3 is connected to the socket post 141-2, and the other end is connected to the side wall of the key body 141-1. In this embodiment, the two elastic supports 141-3 are staggered as shown in the figure.

The socket post 141-2 is sleeved with the fixed post 142. When the shoulder key 141 presses and slides in the mounting hole 140, the socket post 141-2 is sleeved and relatively stationary with the fixed post 142. The two elastic supports 141-3 are deformed towards the sliding direction of the shoulder key 141. The elastic supports 141-3 are made of elastic-plastic with resilience. When the user presses the shoulder key 141, the socket post 141-2 is sleeved with the fixed post 142, therefore the position of the socket post 141-2 is fixed. At this time, the shoulder key 141 slides, the elastic support 141-3 is stretched, and the elastic support 141-3 accumulates elastic potential energy. When the external force of the shoulder key 141 disappears, the elastic potential energy of the elastic support 141-3 is released and restored to its original state, so that the shoulder key 141 is reset to the middle of the mounting hole 140.

It should be understood that the staggered arrangement of the elastic supports 141-3 is not the only embodiment. In other embodiments, the elastic supports 141-3 can also take the socket post 141-2 as the origin and extend to the side wall of the key body 141-1 on both sides. At this time, the origin of the two elastic supports 141-3 is the same, the included angle is 180 degrees, and they are on the same plane. In the present application, the specific structures of the elastic supports 141-3 will not be described in detail. It should be understood that flexible changes in the specific structures of the elastic supports 141-3 should be regarded as within the scope of protection defined by the present application without departing from the basic concept of the present application.

In some embodiments of the present application, as shown in FIGS. 2 and 3, the base 100 is provided with a mating groove 150, which passes through the end faces of the two sliding rails 110, and a mating button 151 is installed in the mating groove 150. A fixed post 142 is inserted into the mating groove 150 from one side of the base 100, and the mating button 151 is sleeved on the fixed post 142. In this embodiment, the mating groove 150 is cylindrical, and the grooving direction is vertical. Specifically, the structure of the mating button 151 is the same as that of the shoulder key 141, and the inside of the mating button 151 also adopts a hollow structure and is provided with a socket post 141-2 and an elastic support member 141-3. The mating button 151 is used for mating gamepad with the equipment host when the equipment host is in the host mode, and the user presses the mating button 151 to make the gamepads enter the pairing mode, so as to connect with different equipment hosts.

In some embodiments of the present application, as shown in FIGS. 2-4, the base 100 is provided with a plurality of light guide grooves 160 at equal intervals. The light guide grooves 160 passes through the end surfaces of the two slide rails 110, and light pipes 161 are arranged in the light guide grooves 160, and the number of the light pipes 161 is equal to that of the light guide grooves 160. In this embodiment, the grooving of the light guide groove 160 is circular, and the light pipe 161 is made of transparent plastic. The light in the gamepad passes through the light guide groove 160 so that the corresponding light pipe 161 can emit light so that the user can recognize the connection sequence of the gamepad and the equipment host at this time. When a plurality of gamepads is connected to the equipment host, the number of the light pipes 161 of the gamepad changes according to the current connection sequence of the gamepad. When the gamepad is the No. 1 gamepad, one light pipe 161 lights up, when the gamepad is the No. 2 gamepad, two light pipes 161 light up, and so on. In this embodiment, the number of the light guide grooves160 and light pipes 161 is four.

It should be understood that the grooving of the light guide groove 160 is circular, and it is not the only embodiment. In other embodiments, the light guide groove 160 may take the shape of a triangle, square, ellipse, etc., and the light pipe 161 corresponds to the shape of the light guide groove 160. In the present application, the shapes of the light guide groove 160 are not described in detail, but it should be understood that the flexible changes of the shapes of the light guide groove 160 should be considered within the scope of protection defined by the present application without departing from the basic concept of the present application.

In some embodiments of the present application, as shown in FIGS. 2-5, a limit groove 130 is formed at one end of the base 100, the limit groove 130 passes through both sides of the base 100, and the limit key 200 is arranged in the limit groove 130, and the grooving direction of the limit groove 130 is parallel to the end face of the slide rail 110. Specifically, the limit groove 130 is arranged at the side away from the mounting groove 120, and the shape of the limit groove 130 is matched with the shape of the limit key 200. In order to fix the position of the limit key 200 in the limit groove 130 and make the limit key 200 play a limiting role, the limit key 200 includes a connecting post 210, a linkage disk 220, and two interlocking pieces 230. The connecting post 210 is inserted into the limit groove 130 from one end of the base 100, and the linkage disk 220 is sleeved with the connecting post 210. The connecting post 210 has the same function as the fixed post 142, which is used to fix the position of the components on the post 142 and prevent its displacement.

The two interlocking pieces 230 are matched with each other, and an elastic piece 240 is arranged between the two interlocking pieces 230. One end of the elastic piece 240 is in contact with the end face of the interlocking piece 230, and the other end is in contact with the end face of the other interlocking piece 230. When the user applies an external force to make the two interlocking pieces 230 close to each other, the elastic piece 240 will be compressed to generate elastic potential energy. When the external force is removed, the elastic potential energy of the elastic piece 240 will be released, and the deformation will be restored, push the two interlocking pieces 230 apart and returning to the original state. The linkage disk 220 is engaged with the tops of the two interlocking pieces 230 and is used to link the two interlocking pieces 230 such that they approach each other or are separated from each other synchronously.

Figure 5:
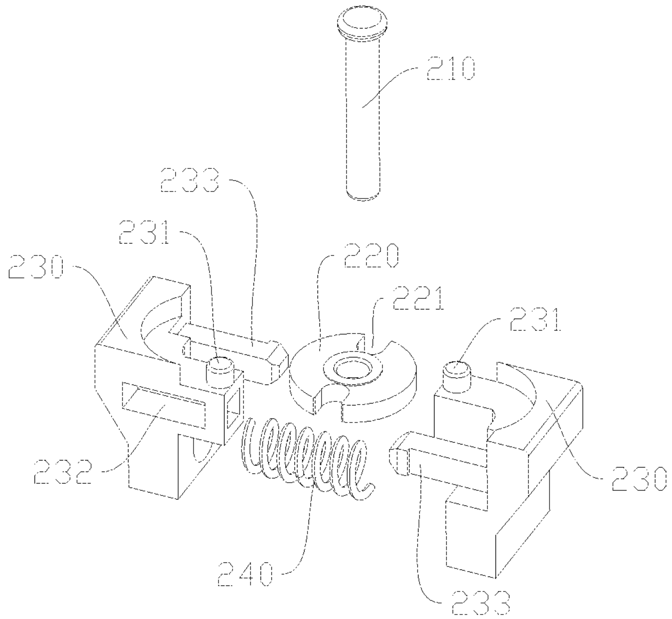
FIG. 5 is an exploded schematic diagram of a limit key according to an embodiment of the present application.

In some embodiments of the present application, as shown in FIGS. 2 and 5, a limit post 231 protrudes from the top of the interlocking piece 230, and U-shaped grooves 221 are formed at both ends of the linkage disk 220. Specifically, the angle between the two U-shaped grooves 221 is 180 degrees, that is, the two U-shaped grooves 221 are located on the same straight line. After the two interlocking pieces 230 are matched, the U-shaped grooves 221 on both sides of the interlocking disk 220 are respectively engaged with the limit posts 231 of the two interlocking pieces 230. One side of the interlocking piece 230 is provided with a sliding groove 232, and the other side is provided with a guide post 233. The sliding groove 232 of the interlocking piece 230 is matched with the guide post 233 of the other interlocking piece 230, and the two interlocking pieces 230 are arranged opposite to each other and are combined with each other through the sliding groove 232 and the guide post 233. A limit part extends from the head of the guide post 233. When the elastic piece 240 pushes the two interlocking pieces 230 to reset, the guide post 233 slides in the sliding groove 232. When the guide post 233 moves to the opening of the sliding groove 232, the limit part can lock the opening of the sliding groove 232, preventing the guide post 233 from separating from the sliding groove 232, thus realizing the limiting function. Specifically, the interlocking piece 230, the guide post 233 and the sliding groove 232 are integrally formed and made of elastic plastic material. In the process of assembling the guide post 233 into the sliding groove 232, the guide post 233 can be assembled into the sliding groove 232 only by applying an external force to deform the guide post 233 and its limit part. The maximum force of the elastic member 240 is less than the deformation bearing capacity of the material of the guide post 233, thus preventing the elastic member 240 from accidentally pushing the guide. The elastic member 240 is located between the two interlocking pieces 230, specifically below, and the linkage disk 220 is located on the top of the two interlocking pieces 230.

When one interlocking piece 230 is moved inward by an external force, the top limit post 231 of the interlocking piece 230 moves synchronously with the interlocking piece 230, and the limit post 231 drives the linkage disk 220 to rotate when it slides, while the limit post 231 located in the other U-shaped groove 221 serves as a driven part, which drives the interlocking disk 220 to move under the rotation, so that the interlocking pieces 230 on the non-stressed side synchronously move inward and slide. When a user applies an external force to the interlocking piece 230 on either side, the two interlocking pieces 230 can move closer to each other synchronously. After the external force is removed, the two interlocking pieces 230 are reset under the action of the elastic piece 240. At this time, the elastic piece 240 pushes the two interlocking pieces 230 to reset during the recovery process. At this time, the two limit posts 231 are far away from each other, and the linkage disk 220 is driven by the limit posts 231 to reset. With this structure, the limit key 200 can realize the function of the limit key 200 no matter when it is connected with the left gamepad or the right gamepad, to limit the relative position between the gamepad and the equipment host.

Figure 6:
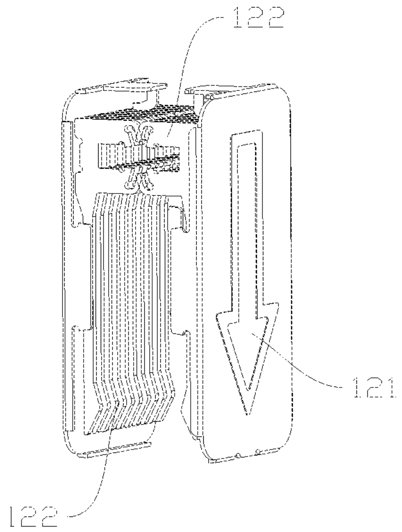
FIG. 6 is a schematic diagram of a mounting groove according to an embodiment of the present application.

In some embodiments of the present application, as shown in FIGS. 2, 3, and 6, the guide pins 122 are L-shaped, the long ends of the guide pins 122 fit the back of the mounting groove 120, the short ends of the guide pins 122 extend into the base 100, and the short ends of the guide pins 122 on both sides are in contact with each other in the base 100, thus realizing the electrical connection of the two sliding rails 110. The guide pins 122 on both sides are electrically connected with the gamepad and the equipment host respectively. When the double-ended slide rail is connected with the gamepad and the equipment host, the input signal of the gamepad is transmitted to the equipment host through the guide pins 122, and the equipment host can transmit power to the gamepad through the guide pins 122 to make the gamepad work normally. When the double-ended slide rail is connected with the left gamepad or the right gamepad, the pins 122 of the guide rail can be normally communicated, so that the versatility is better.

Figure 7:
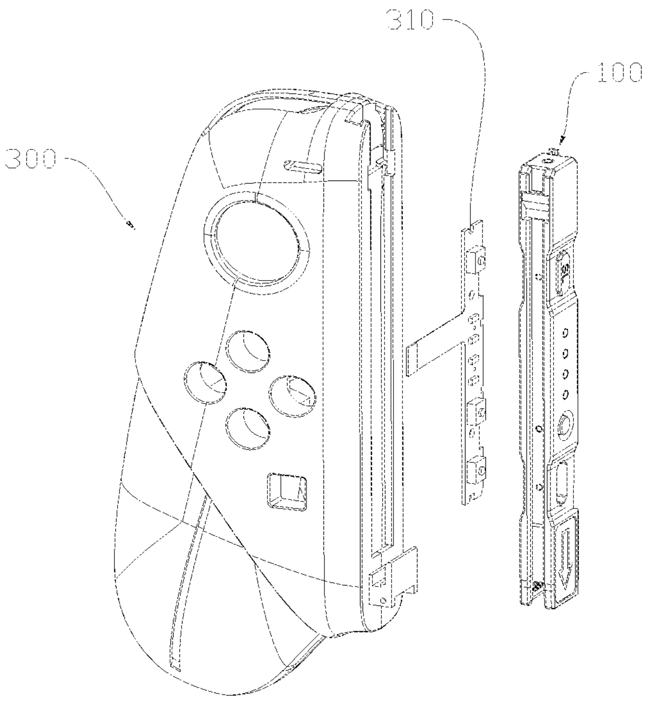
FIG. 7 is a schematic diagram of the connection between the double-ended slide rail and the gamepad according to the embodiment of the present application.

In some embodiments of the present application, as shown in FIG. 7, the gamepad includes a shell 300 and a circuit board 310 provided with a plurality of trigger keys. The shell 300 has a groove, and the groove is detachably connected with the slide rail 110 of the double-ended slide rail, while the circuit board 310 is arranged inside the groove, and one end of the circuit board 310 is electrically connected with the guide pins 122. Specifically, the groove structure of the gamepad is the same as that of the side of the equipment host. The two sliding rails 110 of the double-ended slide rail can be used for both left and right sides, and the position of the trigger button on the circuit board 310 corresponds to the position of the shoulder key 141 and the mating button 151 of the double-ended slide rail. When the double-ended slide rail is installed in the groove of the gamepad, pressing the shoulder key 141 or the mating button 151 can trigger the trigger button on the circuit board 310 in the groove. The circuit board 310 is separated from the double-ended slide rail. Compared with the existing unilateral slide rail with an integrated circuit structure, the separated design of the present application can reduce the manufacturing cost and greatly reduce the maintenance cost.

After the gamepad is connected with the equipment host through the double-ended slide rail, the circuit board 310 in the groove of the gamepad contacts and communicates with the guide pin 122 of the slide rail 110 near one side of the groove, so that the signal of the gamepad can be transmitted to the equipment host.

In the description of this specification, referring to the terms "one embodiment", "some embodiments", "illustrative embodiments", "examples", "specific examples" or "some examples" means that the specific features, structures, materials or characteristics described in connection with this embodiment or example are included in at least one embodiment or example of the present application. In this specification, the schematic expressions of the above terms do not necessarily refer to the same embodiment or example. Furthermore, the specific features, structures, materials or characteristics described may be combined in any one or more embodiments or examples in a suitable manner.

Although the embodiments of the present application have been shown and described, those skilled in the art can understand that many changes, modifications, substitutions, and variations can be made to these embodiments without departing from the principles and purposes of the present application, and the scope of the present application is defined by the claims and their equivalents.

What is claimed is:

1. A double-ended slide rail, comprising:

a base, wherein one end of the base is provided with a limit groove, two sides of the base are respectively provided with slide rails, the two slide rails are symmetrically arranged along an axial direction of the base, the two slide rails have a same structure, the slide rail on either side is used for connecting with a gamepad, and the slide rail on the other side is used for sleeve-connecting with an equipment host or the slide rail;

a mounting groove arranged at one end of the slide rails, wherein a surface of the mounting groove is provided with a guide mark to guide the user to insert the slide rails into a correct mounting groove position, a back of the mounting groove is provided with a guide pin, and guide pins of the two slide rails are in contact connection; and a limit key arranged at the one end of the base, wherein the limit key comprises a connecting post, a linkage disk, two interlocking pieces, and an elastic piece, the connecting post is inserted into the limit groove from the one end of the base, the linkage disk is sleeved with the connecting post, the two interlocking pieces are matched with each other, the elastic piece is arranged between the two interlocking pieces, one end of the elastic piece contacts an end face of the interlocking piece and other end of the elastic piece contacts an end face of the other interlocking piece, the linkage disk is engaged with tops of the two interlocking pieces and is used for linking the two interlocking pieces such that the two interlocking pieces synchronously approach each other or are separated from each other.

2. The double-ended slide rail according to claim 1, wherein the base is provided with a plurality of mounting holes, and the mounting holes pass through the end faces of the two slide rails;

a shoulder key is installed in the mounting hole, a fixed post is inserted into the mounting hole from one side of the base, and the shoulder key is sleeved on the fixed post.

3. The double-ended slide rail according to claim 2, wherein the shoulder key comprises a key body and a socket post, the key body is hollowed out, the socket post is arranged at a middle part of the key body; elastic supports extend respectively along the side wall of the key body at the two sides of the socket post, and the socket post is sleeved with the fixed post;

when the shoulder key slides in the mounting hole, the socket post and the fixed post is relatively stationary, and the two elastic supports are deformed towards a sliding direction of the shoulder key.

4. The double-ended slide rail according to claim 3, wherein the base is provided with a mating groove, and the mating groove passes through the end faces of the two slide rails;

a mating button is installed in the mating groove, and the fixed post is inserted into the mating groove from one side of the base; the mating button is sleeved on the fixed post, and the mating button has a same structure as the shoulder key.

5. The double-ended slide rail according to claim 1, wherein the base is provided with a plurality of light guide grooves at equal intervals, the light guide grooves pass through the end faces of the two slide rails, and light pipes are arranged in the light guide grooves, and the number of the light pipes is equal to that of the light guide grooves.

6. The double-ended slide rail according to claim 1, wherein the limit groove passes through both sides of the base, the limit key is arranged in the limit groove, and a grooving direction of the limit groove is parallel to an end face of the slide rail.

7. The double-ended slide rail according to claim 1, wherein a limit post protrudes from the top of the interlocking piece, and both ends of the linkage disk are provided with U-shaped grooves; after the two interlocking pieces are matched, the two U-shaped groove of the linkage disk are respectively engaged with limit posts of the two interlocking pieces;

one side of the interlocking piece is provided with a sliding groove and the other side is provided with a guide post, and the sliding groove of the interlocking piece is matched with the guide post of the other interlocking piece.

8. The double-ended slide rail according to claim 1, wherein the guide pin is L-shaped, a long end of the guide pin fits the back of the mounting groove, a short end of the guide pin extends into the base, and the short ends of the guide pins on both sides are in contact connection in the base.

9. A gamepad, comprising the double-ended slide rail according to claim 1;

wherein the gamepad further comprises a shell and a circuit board provided with a plurality of trigger keys, wherein the shell is provided with a groove that is detachably connected with the slide rails of the double-ended slide rail, and the circuit board is arranged at an inner side of the groove, and one end of the circuit board is connected with the guide pin.

* * * * *